United States Patent
Valdez

(10) Patent No.: US 9,964,725 B1
(45) Date of Patent: May 8, 2018

(54) FIBER OPTIC LAYING TOOL

(71) Applicant: Jose M Valdez, Miami, FL (US)

(72) Inventor: Jose M Valdez, Miami, FL (US)

( * ) Notice: Subject to any disclaimer, the term of this patent is extended or adjusted under 35 U.S.C. 154(b) by 0 days. days.

(21) Appl. No.: 15/713,634

(22) Filed: Sep. 23, 2017

(51) Int. Cl.
*G02B 6/46* (2006.01)
*G02B 6/44* (2006.01)

(52) U.S. Cl.
CPC ......... *G02B 6/4439* (2013.01); *G02B 6/4457* (2013.01)

(58) Field of Classification Search
None
See application file for complete search history.

(56) References Cited

U.S. PATENT DOCUMENTS

| | | | |
|---|---|---|---|
| 3,111,440 A * | 11/1963 | Prentice | B29C 41/365 118/325 |
| 6,915,549 B2 * | 7/2005 | Forsberg | B25B 27/0092 29/235 |
| 9,263,870 B2 * | 2/2016 | Mann | G02B 6/4466 |
| 2012/0007030 A1 * | 1/2012 | Barrett | H02G 1/085 254/134.3 R |
| 2012/0020635 A1 * | 1/2012 | Hendrickson | B65H 49/205 385/135 |
| 2012/0138214 A1 * | 6/2012 | Burek | G02B 6/4457 156/166 |
| 2013/0020015 A1 * | 1/2013 | Dickinson | B65H 49/205 156/166 |
| 2013/0098557 A1 * | 4/2013 | Takeuchi | B65H 35/004 156/349 |

FOREIGN PATENT DOCUMENTS

DE 19533766 C1 * 10/1996
DE 19827591 A1 * 12/1999

* cited by examiner

*Primary Examiner* — Jeffry H Aftergut
(74) *Attorney, Agent, or Firm* — Christopher J. Vandam, PA; Chris Van Dam

(57) ABSTRACT

A tool and method of use for installing fiber optic strands. The tool accepts the strand in a hollow interior and feeds the strand out an end of the tool. A foot of the tool embeds the strand into a leading bead of caulk and smooths out the caulk. A curved guide transitions the fiber from the reel into the tube without exceeding the fiber's minimum bending radius.

3 Claims, 3 Drawing Sheets

FIBER OPTIC LAYING TOOL

II. BACKGROUND OF THE INVENTION

1. Field of the Invention

The present invention relates to fiber optic data lines, and more particularly, to a tool to aid in laying and concealing fiber optic strands in buildings.

2. Description of the Related Art

Several designs for fiber optic tools have been designed in the past. None of them, however, includes a guide tube that inside which passes a fiber strand that is adapted and dimensioned to fit a human hand that also has a foot and guide assembly to lay the fiber strand in a pre-laid bead of caulk in one easy motion.

Applicant believes that the closest reference corresponds to a commonly available spoon shaped putty knife. Installers will lay a bead of caulk and press a bulk spool strand into the caulk. This takes two passes, one with the caulk and then repeating the pass with the fiber optic strand a knife tool.

There are inherent risks of manually handling strands of fiber because the brittle, thin strands can pierce skin and break off leaving a serious injury to the installer. This risk is increased by the repeated picking up and laying down the caulk gun alternating with the spool and knife during the installation process.

Other patents describing the closest subject matter provide for a number of more or less complicated features that fail to solve the problem in an efficient and economical way. None of the prior art suggests the novel features of the present invention.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

III. SUMMARY OF THE INVENTION

It is one of the main objects of the present invention to provide a fiber optic strand laying tool that is safer for the installer to use by improving the way the strands are handled.

It is another object of this invention to provide a tool and method of use to quickly lay long strands of fiber optic in one pass without the effort of first laying a bead of caulk and then re-covering the same area with the fiber strand.

It is still another object of the present invention to provide a low cost and effective tool that can be used without extensive training and equipment costs.

It is yet another object of this invention to provide such a device and method of use that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE PREFERRED EMBODIMENT

Figure 1:
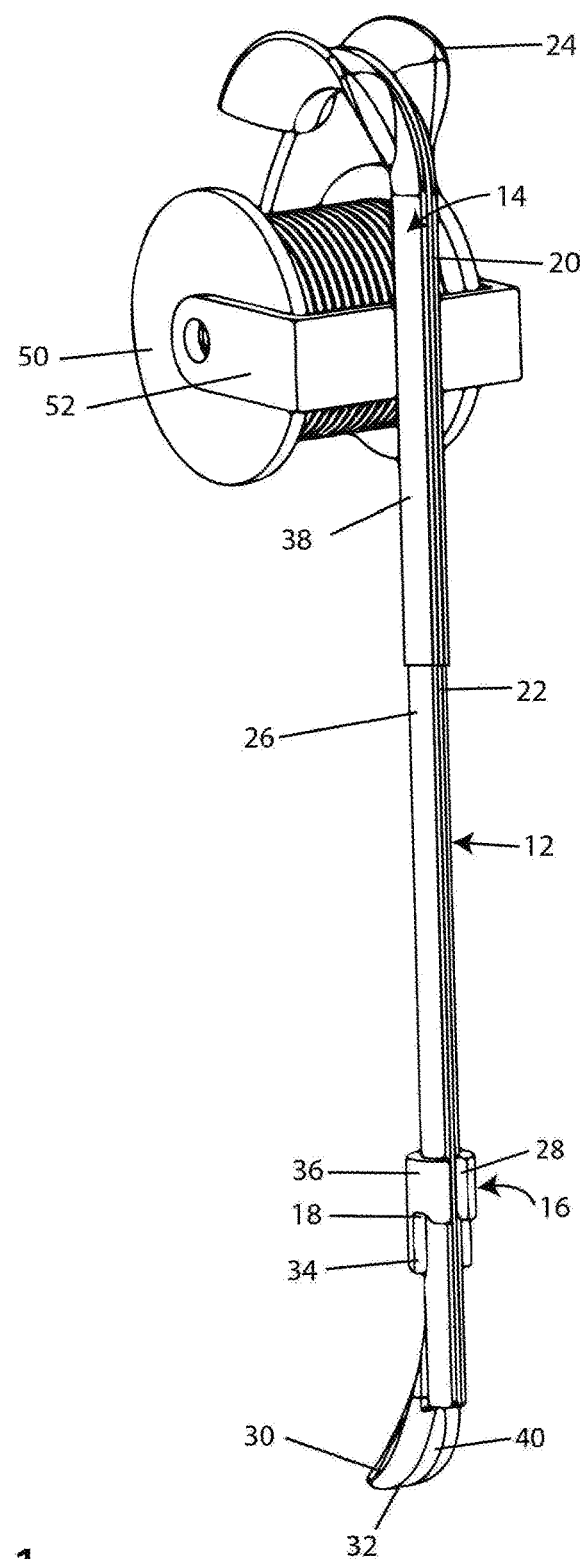
FIG. 1 shows a perspective view of an example of a fiber optic laying tool.
Figure 2:
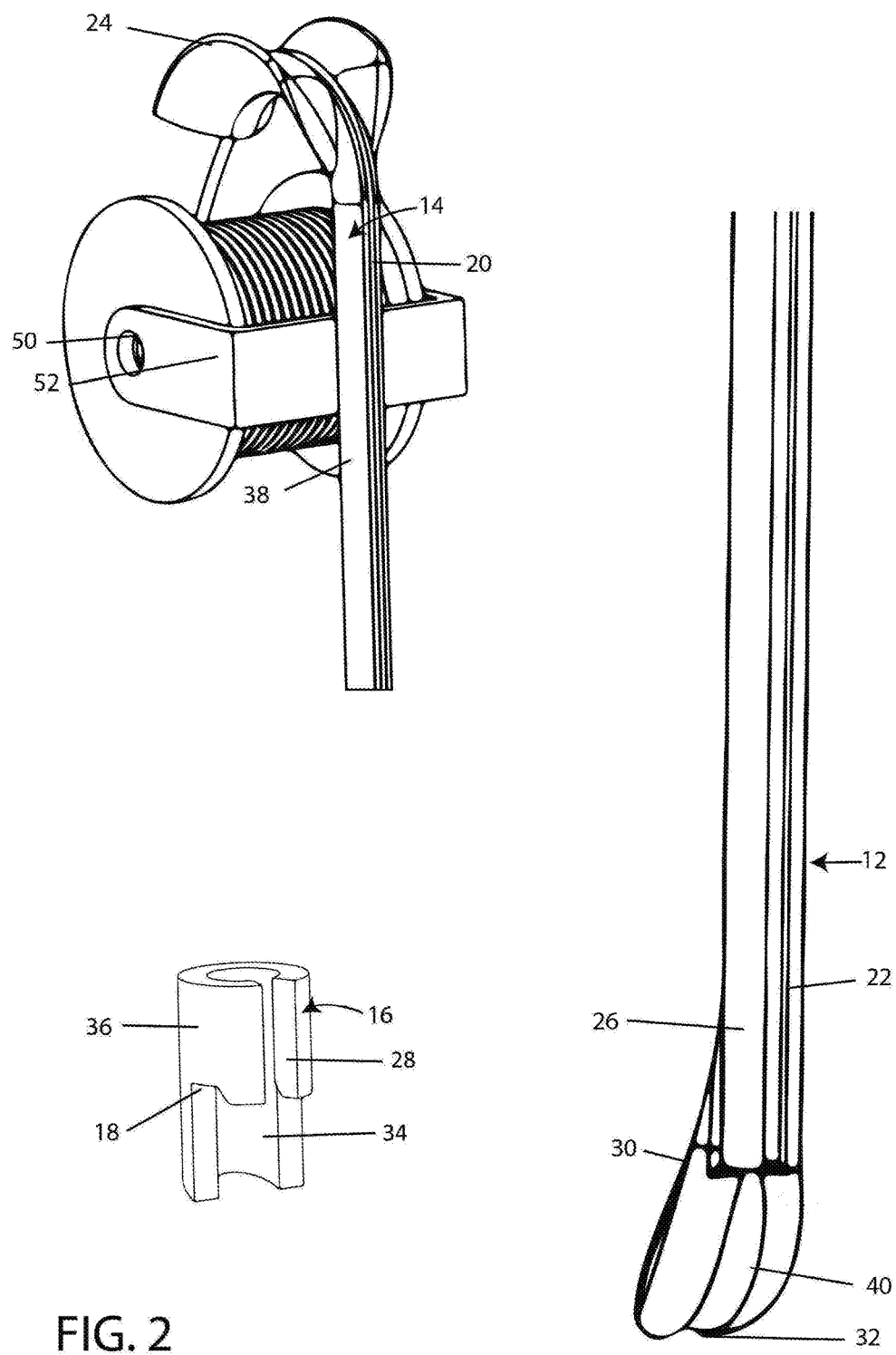
FIG. 2 shows an exploded perspective view of a fiber optic laying tool.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the fiber optic laying tool, the tool, the fiber tool, the machine or other similar terms. Fiber optic line can be alternatively referred to as lines, strands, fibers or other industry acceptable terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, it can be observed that it basically includes a tube assembly 12, a head assembly 14, a guide assembly 16, a notch 18, a channel 20, a channel 22, a guide 24, a tube 26, a channel 28, a foot 30, a mouth 32, a tip 34, a tube 36, a tube 38, a groove 40, a reel 50, a bracket 52, a fiber optic strand 54, caulk 56 and a tube 58.

The process starts by identifying a location where a strand or bundle of fiber optic line 54 is to be laid. Typically, the strand 54 can be hidden in a corner between a wall and ceiling. A thin bead of caulk 56 from a tube 58 is applied along the pathway that the line 54 will be laid. The caulk 56 can be color matched to the surrounding wall. In many cases the caulk will be white to match the color of most residential and home interior ceiling to best hide the strand 54.

Immediately after laying the bead of caulk 56 and while that caulk 56 has not begun to set up, cure or skin over a strand or bundle of fiber optic line 54 must be pressed into the caulk 56. The caulk 56 acts as an adhesive to secure the line 54 to the corner as well as a concealer and protector of the fragile fiber optic line 54.

A characteristic of fiber optic line 54 is that it can crack and break if forced around too small of a radius. When the fiber 54 breaks it poses a risk for penetrating the skin of the user like a very thin needle. If it breaks off inside the skin it can cause a serious injury requiring medical intervention and is rather painful.

The present tool provides a protective barrier between the fiber line 54 and the user's hand when dispensing the fiber line 54 from a spool 50, through the tube 26 and tube 38. The diameter inside the tube 26 and tube 38 is sufficient to allow the preselected fiber or bundle of fibers 54 to easily pass through with minimal drag or frictional resistance during the dispensing process.

Structurally, the tube 26 has a channel 22 along its entire length. The channel 22 allows the fiber strand 54 to be inserted into and along the length of the tube 26. The tube 38 also has a channel 20 that must be aligned with the channel 22 on the head assembly 14. Similarly, when inserting the fiber strand 54 while preparing the tool for use the channel 28 in the guide assembly 16 is also aligned with the channel 22 on the tube assembly 12.

The head assembly 14 has an internal diameter corresponding to the exterior diameter of the tube assembly 12 so that the head assembly 14 essentially friction fits over the top of the tube assembly 12. The fit is such that the head assembly 14 wont inadvertently slip off the top of the tube assembly 12 or inadvertently rotate to align the channel 20 with the channel 22 thereby allowing the strand 54 to escape from inside the tube assembly 12.

One variation of the device may include a lock ring permanently bonded to the tube 26 with its channel aligning with the channel 22. The lock ring acts as a seat up to which the head assembly 14 is pushed onto the tube assembly 12. The lock ring allows consistent positioning of the head assembly 14 onto the tube assembly. By having a consistent position the user of the device can affirmatively feel that the head assembly is fully seated onto the top of the tube assembly 12 and will not travel too far down the tube assembly 12. This also ensures that the fiber strand 54 (or bundle of fibers) enters the very top of the tube 26.

Once the fiber strand 54 is inside the tube 26 prior to use, the head assembly 14 is rotated so that the channel 20 no longer lines up with the channel 22 and the strand 54 is captured within the top of the tube 26. The guide 24 is optionally provided on the upper end of the head assembly 14 to provide a path for the fiber strand 54 to follow off of the reel 50 and into the tube 26 without bending the fiber strand 54 beyond its minimum bending radius. The guide 24 is smooth and concave to reduce friction on the fiber strand 54. The guide 24 is integral to the head assembly 14 and therefore also rotates with the head assembly 14 relative to the channel 22 on the tube assembly 12.

The guide assembly 16 has an interior diameter dimensioned complimentary to the outside diameter of the lower end of the tube assembly 12. This is essentially a friction fit between the guide assembly 16 and the tube assembly 12. This allows the guide assembly 16 to readily rotate relative to the tube assembly 12 and remain in that position. This is true for whether the channels 22 and 28 are aligned during set up of the tool and when channels 22 and 28 are out of alignment during normal tool operation.

The guide assembly 16 similarly has the channel 28 line up with the channel 22 on the tube assembly 14 during setup of the fiber optic tool when initially placing a fiber optic strand 54 inside the tube 26. Once the strand 54 is inside the tube 26 the guide assembly is rotated to offset the channel 28 from the channel 22 thereby locking the fiber strand into the bottom side of the tube assembly 14. When the guide assembly 16 is closed, thereby locking the fiber strand 54 into the tube 26, the notch 18 in the guide assembly 16 can be pressed over the top of the foot 30. This prevents rotation of the guide assembly 16 during use and keeps the fiber optic strand inside the tube 26.

The lower side of the tube assembly 12 has an integral curved foot 30. The bottom side of the foot 30 preferably, but optionally, includes a longitudinal groove 40 and terminates at the lowest tip in a mouth 32. The foot 30 may have a degree of flexibility so that it bends under slight hand pressure when the tool is in use.

When the fiber optic tool is set up for use the fiber strand 54 travels from the top of the tube assembly 12 and head assembly 14 passing entirely through the hollow center of the tube assembly 12 and exits the tube 26 at the upper edge of the foot 30. The fiber strand 54 then is guided along the underside of the foot 30 by riding in the groove 40 as the strand 54 leaves the tool at the mouth 32.

The mouth 32 in an effective form is a V-shaped cutout of the terminal end of the foot 30. During use, the operator can tilt the tube assembly 12 and thereby also affecting the oriantation of the foot 30 to navigate around corners or other structure on the wall onto which the fiber strand(s) 54 are being affixed. The mouth 32 in combination with he groove aids in keeping the fiber strand 54 between the foot 30 and the wall during normal use and operation.

Figure 3:
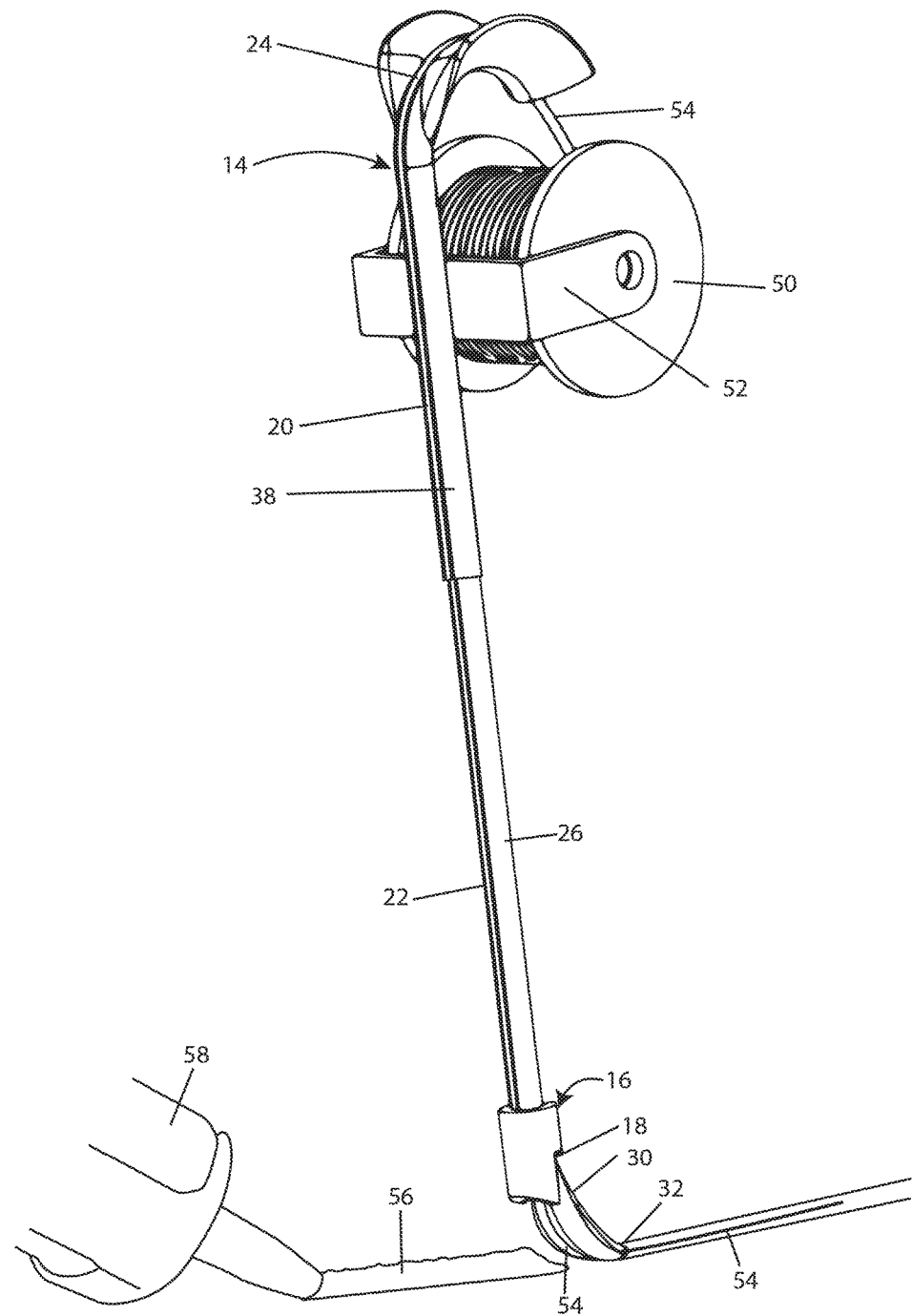
FIG. 3 shows a perspective view of an example of a fiber optic laying tool.

FIG. 3 shows a version of the tool with an optional and useful reel 50 mounted to the upper end of the tool. The reel 50 holds a spool of fiber strand 54 that will be applied with the tool. A bracket 52 affixes the reel 50 to the head assembly 14 to allow the user to freely move without having to hold a spool of fiber in addition to the tube 58 and the tool itself.

The reel 50 may include a tensioner to adjust the appropriate amount of resistance on the spool. Too light a tension and the reel may inadvertently unwind uncontrollably. Too much pressure and the reel 50 will not release the strand easily enough to continuously lay the selected line of fiber strand 54.

To use the tool the operator will first attach the preselected spool of fiber strand 54 to the reel 50. The head assembly 14 channel 20 and the guide assembly 16 channel 28 will both be aligned with the channel 22 on the tube assembly 12. The fiber strand 54 will be placed into the channel 22 so that the tip of the fiber strand 54 extends a few inches beyond the mouth 32 end of the foot 30. The head assembly 14 and the guide assembly 16 are then rotated so that the channel 20 on the head assembly 14 and the channel 28 on the guide assembly 16 are not aligned over the channel 22 on the tube assembly 12 thereby capturing the fiber strand 54 within the tube 26. The notch 18 is fit over the upper edge of the foot 30 to prevent rotation of the guide assembly 16 that in turn could allow the fiber strand 54 to escape the confines of the interior of the tube 26. The fiber strand 54 remains capable of being pulled through the tube 26 during normal use.

Once the fiber optic tool is set up as described immediately above and the pathway where the fiber strand is to be laid is determined the installer is ready to begin. A tube 58 containing caulk 56 is used to lay a bead of caulk 56 along the intended path of the fiber optic strand 54. The caulk 56 should be about the equivalent of an eighth to a quarter of an inch in diameter. There should be enough caulk 56 to bed the strand 54 into and adhere the strand 54 to that position.

Immediately following the caulk 56 the end segment of the fiber strand is started bedding into the caulk with enough end segment exposed to make a fiber connection to a junction, splice or other terminal connection. While the caulk has not yet skinned over or substantially begun hardening the foot 30 of the tool skims the top of the bead of caulk 56. The mouth 32 continually presses the fiber strand 54 into the caulk as the foot 30 progresses laying down a longer line of fiber 54. The foot 30 being slightly wider than the mouth 32 smooths over the wet caulk 56 to seal the fiber 56 inside the bead of caulk 56.

The fiber optic laying tool can be used with one hand and the caulk tube 58 can be operated with the installer's other hand to lay an indefinite length of fiber optic strands in one smooth motion. This can greatly speed the rate at which fiber can be laid.

A version of the invention can be fairly described as a fiber optic laying tool comprised of a tube assembly, a head assembly and a guide assembly. The head assembly has a first sidewall surrounding a first open cylindrical center, essentially a tube. The first open cylindrical center is dimensioned to rotatably fit over a first end segment of the tube assembly. The head assembly has a first channel or slit along its entire length completely bisecting the first sidewall of the head assembly. The tube assembly has a second sidewall surrounding a second open cylindrical center, essentially a tube. The tube assembly has a second channel or slit along its length bisecting the second sidewall of the tube assembly. The tube assembly at a second end has a foot projecting away at an angle from an end of the second channel. A bottom side of the foot has a groove to guide the fiber. The foot terminates at a mouth or tip. A guide assembly has a third sidewall surrounding a third open cylindrical center, essentially a tube. The third sidewall has a channel or slit completely bisecting the third sidewall of the guide assembly. The third open cylindrical center is dimensioned to rotatably fit over a second end segment of the tube assembly. A reel is operatively affixed to the guide assembly. A curved guide is affixed to the head assembly that guides a fiber strand from the reel into the tube assembly at a radius not exceeding a minimum bending radius of the fiber strand thereby preventing the fiber strand from breaking making the transition from the reel to the tube.

A version of the invention can include where the head assembly 14 and the guide assembly 16 are made of one contiguous and unified assembly. In this embodiment the channel 20 and channel 28 are essentially the same channel continued from one end of the device to the other end of the device. In other words, when the channel 20 is lined up with the channel 22 then the channel 28 is also lined up with the channel 22. The unified head assembly 14 and guide assembly 16 can be rotated together to expose the channel 22 during setup of the device and then rotated so that the channels 20 and 28 are not aligned over the channel 22 to lock in the fiber optic strand and then be slid towards the foot 30 so that the notch 18 fits over the top of the foot 30 and therefore the head assembly 14 and guide assembly 16 are locked in the functional mode where the channel 20 is sealed closed, capturing the fiber strand.

A method of using the fiber optic laying tool can be fairly described as being comprised of the steps: align the first channel and the third channel with the second channel to allow access to the entire length of the second open cylindrical center. Then inserting a fiber optic strand into the second open cylindrical center so it passes entirely through the tube. Rotate the head assembly and the guide assembly so that the first channel and the third channel do not align with the second channel thereby securing the fiber optic strand inside the second open cylindrical center from end to end. Lay down a bead of caulk along a preselected route for running the fiber optic strand. Then position a first end of the fiber optic strand along the groove. Then press the foot against a segment of the bead of caulk so that the fiber optic strand is pressed into the bead of caulk. Then drag the foot along and contacting the bead of caulk continually leaving the fiber optic strand embedded into the bead of caulk. Lastly, allow the bead of caulk to harden with the fiber optic strand embedded inside the bead of caulk.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fiber optic laying tool comprised of a tube assembly, a head assembly and a guide assembly;
   the head assembly has a first sidewall surrounding a first open cylindrical center;
   the first open cylindrical center is dimensioned to rotatably fit over a first end segment of the tube assembly;
   the head assembly has a first channel along its entire length completely bisecting the first sidewall of the head assembly;
   the tube assembly has a second sidewall surrounding a second open cylindrical center;
   the tube assembly has a second channel along its length bisecting the second sidewall of the tube assembly;
   the tube assembly at a second end has a foot projecting away from an end of the second channel;
   a bottom side of the foot has a groove;
   the foot terminates at a mouth;
   a guide assembly has a third sidewall surrounding a third open cylindrical center;
   the third sidewall has a third channel completely bisecting the third sidewall of the guide assembly;
   the third open cylindrical center is dimensioned to rotatably fit over a second end segment of the tube assembly;
   the guide assembly has a notch that selectively engages the foot to lock the guide assembly relative to the tube assembly;
   a reel is operatively affixed to the head assembly;
   a curved guide is affixed to the guide assembly that guides a fiber strand from the reel into the tube assembly at a radius not exceeding a minimum bending radius of the fiber strand.

2. A method of using the fiber optic laying tool of claim 1 comprised of the steps:
   align the first channel and the third channel with the second channel to allow access to the entire length of the second open cylindrical center;
   inserting a fiber optic strand into the second open cylindrical center;
   rotate the head assembly and the guide assembly so that the first channel and the third channel do not align with the second channel thereby securing the fiber optic strand inside the second open cylindrical center;
   lay down a bead of caulk along a preselected route for running the fiber optic strand;
   position a first end of the fiber optic strand along the groove;
   press the foot against a segment of the bead of caulk so that the fiber optic strand is pressed into the bead of caulk;
   drag the foot along and contacting the bead of caulk continually leaving the fiber optic strand embedded into the bead of caulk;
   allow the bead of caulk to harden with the fiber optic strand embedded inside the bead of caulk.

3. The fiber optic laying tool as of claim 1 further characterized in that the head assembly and the guide assembly are fabricated of one unified part so that the first channel is permanently aligned with the third channel.

* * * * *